April 19, 1927.
P. H. TROUT
1,625,061
WELDED COMPOSITE CORRUGATED SHEET
Filed Feb. 19, 1925
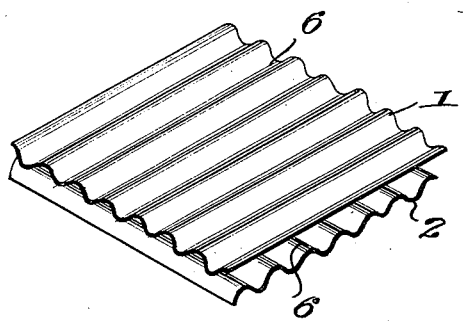
Fig. 1.
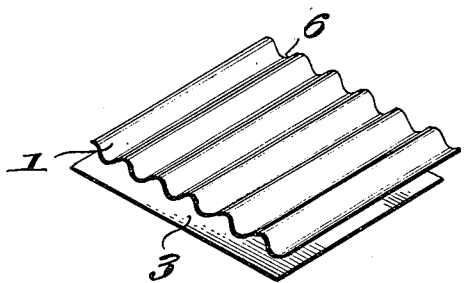
Fig. 2.
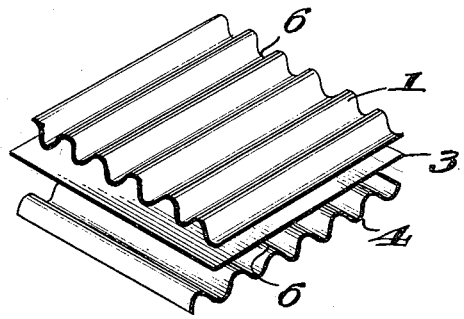
Fig. 3.
Fig. 4.
Inventor,
Philip H. Trout
By
Atty.

Patented Apr. 19, 1927.

1,625,061

UNITED STATES PATENT OFFICE.

PHILIP H. TROUT, OF ROANOKE, VIRGINIA.

WELDED COMPOSITE CORRUGATED SHEET.

Application filed February 19, 1925. Serial No. 10,422.

The art of electric welding discloses the idea of welding plates in spots or along a line of contact, one patent for such subject matter being that to Thomson, No. 444,928, January 20, 1891.

My invention utilizes the principle of spot or line electric welding for producing, by a new method, a novel composite corrugated metal plate construction, whether flat or curved, which will be light in weight, strong and durable as compared to its weight, and adapted to be manufactured from different metals or combinations of different kinds of metals for various uses.

In carrying out the invention two or more corrugated sheets may be used, or, an uncorrugated sheet combined with a corrugated sheet, or an uncorrugated sheet combined with corrugated sheets. This specification of variants is not in limitation of the invention but is by way of illustration of the various forms the composite sheet may assume.

In using the word "corrugated" in this specification and in the appended claims, it is to be understood that such word is used in its broadest sense to cover a sheet which is regularly or irregularly corrugated, whether the corrugations be continuous, or interrupted and whether they be rounded or angular and whether of crimped or of truly sinuous form.

While illustration is made only of flat composite sheets, the invention embraces not only flat sheets but curved or cylindrical sheets. Furthermore, the channels between the members of the sheet may be filled with any material, left open, or used for the passage of vapors or liquids.

Methods of spot and line welding being well known, no illustration is given in the drawings in connection therewith, as it is the method of electrowelding as used for the production of my improved composite sheet that constitutes the method being claimed as a part of the invention.

The principle of the invention is the method of electrically welding corrugated metal sheets, or an uncorrugated or plain sheet to one or more corrugated sheets either in spots or along lines where contact exists between the sheets; also, the novel composite corrugated sheet produced by this method.

In the accompanying drawings:

Figure 1 illustrates, in perspective, an embodiment of the composite sheet comprising crossed superposed corrugated sheets welded together in spots or along their lines of contact.

Fig. 2 is a similar view showing an uncorrugated sheet welded to a corrugated sheet.

Fig. 3 is a similar view showing an uncorrugated sheet welded to corrugated sheets; and Fig. 4 is a cross section of a corrugated sheet which may be used wherein the sides of the corrugations are flat and the ridges are angular.

Referring first to Figure 1, crossed corrugated sheets 1, 2, comprise the welded structure.

In Figure 2 the corrugated sheet 1 is welded to a plain or uncorrugated sheet 3.

In Figure 3 the upper corrugated sheet 1 and the lower corrugated sheet 4 are arranged in crossed relation, with an interposed uncorrugated sheet 3 to which they are welded.

Figure 4 illustrates another cross sectional shape 5 of the corrugated sheet, to illustrate that the corrugations need not be of true sinuous form but may be of a crimped form with straight sides and sharp angles.

In the construction of the sheet shown in Figure 1, the sections 1 and 2 are arranged in superposed relationship with the corrugations running at an angle to each other. The angle may be a right angle or any other angle which effects a crossing of the lines constituting the ridges 6 of the corrugations. The ridges 6 of the plates 1 and 2 touch only where they intersect or cross, that is in spots or limited areas. When the sheets are pressed together and electric current sent through the crossed parts, spots, or intersections by an electric welding machine, the sheets become welded together at such spots to form a strong, light, compound or composite sheet.

The welding may be effected by pressing the sheets together and running them through suitably corrugated rollers forming the welding terminals of an electric welding machine or apparatus and applying the current. On the other hand, welding may be effected by the use of a corrugated roller applied to one of the sheets, say sheet 1, and a corrugated surface applied to the other sheet, say sheet 2, with the application of a welding current through the roller and corrugated surface forming the electric terminals, or, the sheets 1 and 2 may be welded together between two corrugated surfaces or electric contacts of a welding machine.

Suitable corrugated rollers are used to effect welding of flat sheets, or cylinders, or when uniting sheets of relatively large area.

Two corrugated welding terminals may be used to best advantage in manufacturing small areas of composite sheets according to my invention or in building up square cornered boxes from continuous sheets of metal.

A plain roller or rollers, such as disks or wheels having rounded or beveled edges, might also be used where it is desired to weld along only one corrugation of the structure.

Various combinations of welding rollers or rollers and surfaces may be employed. One such arrangement constitutes a positive electric terminal, say the upper roller, from which the electrical current passes down through the work into a long conducting roller or surface and is carried through such long conducting roller or surface some distance away from the first electrical contact roller and then up through the work to another roller so that the welding current will make two welds at one pass of the sheets.

It is not necessary that the work be welded at all points or lines of contact and I wish it understood that my invention is not limited to the precise points or lines where welding is effected in any of the embodiments illustrated in the drawings or other embodiments within the spirit of the invention.

In the embodiment shown in Figure 2 the contact is between lines or ridges of the corrugated plate 6 and the plain plate 3 and this form is of advantage where a structure is needed that has one flat or uncorrugated surface.

In the form shown in Figure 3, the contact is between all ridges of the corrugated plates and the flat plate.

In all forms of the invention it is not necessary that the ridges of one corrugated plate lie at right angles to those of another corrugated plate as any angular relationship will serve the purpose.

My improved composite or compound welded sheet has several advantages; first, it is strong in comparison to its weight; second, sheets of different metals may be united, thus a thin sheet of a precious metal may be backed and strengthened by a sheet of semi-precious or non-precious metal; third, the points or lines of contacts being small, only a small electric current, at small cost, is required to effect welding; fourth, the spaces formed by the corrugations between the sheets may be filled with various substances to produce sound or heat insulating properties, or these spaces may be left open and the structure used in radiators or condensers for the passage of vapors or liquids.

I claim:

1. An electrically welded composite sheet metal structure, comprising two or more sheets, of which at least one sheet is ribbed or corrugated substantially throughout its extent, the corrugations or ribs being electrically welded to the sheet contacting therewith, the surfaces of said sheets being otherwise out of direct contact with each other.

2. An electrically welded composite sheet metal structure, comprising sheets which have substantially parallel ribs or corrugations substantially throughout their extent, the ribs or corrugations of one sheet being arranged in intersecting relationship to those of the other sheet, said ribs or corrugations being electrically welded together at points of contact.

3. A fabric composed of two or more metal sheets, one or more of said sheets being corrugated, ribbed, or grooved substantially throughout its extent so as to be stiff and strong in a certain direction or directions, said sheets being superimposed and electrically welded together at various contacting points so that they reinforce each other, the resulting fabric being stiff and strong in both directions.

In testimony whereof I affix my signature

PHILIP H. TROUT.